United States Patent
Muto

(10) Patent No.: US 9,374,013 B2
(45) Date of Patent: Jun. 21, 2016

(54) POWER CONVERSION APPARATUS AND POWER CONVERSION METHOD

(71) Applicant: Toyota Jidosha Kabushiki Kaisha, Toyota-shi Aichi-ken (JP)

(72) Inventor: Jun Muto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 224 days.

(21) Appl. No.: 14/282,478

(22) Filed: May 20, 2014

(65) Prior Publication Data

US 2014/0347892 A1 Nov. 27, 2014

(30) Foreign Application Priority Data

May 21, 2013 (JP) .................................. 2013-107423

(51) Int. Cl.
 *H02M 3/335* (2006.01)

(52) U.S. Cl.
 CPC ...... *H02M 3/33584* (2013.01); *H02M 3/33561* (2013.01)

(58) Field of Classification Search
 CPC .............. H02M 2001/0074; H02M 2001/0083
 See application file for complete search history.

(56) References Cited

U.S. PATENT DOCUMENTS

| | | | | |
|---|---|---|---|---|
| 3,571,689 A * | 3/1971 | Wise | ...................... | H02M 1/084 318/800 |
| 5,576,940 A * | 11/1996 | Steigerwald | ............ | H02J 1/102 363/17 |
| 6,388,904 B2 * | 5/2002 | Nomura | ............ | H02M 3/33569 363/132 |
| 6,574,125 B2 * | 6/2003 | Matsukawa | ....... | H02M 3/33569 363/132 |
| 7,408,794 B2 * | 8/2008 | Su | ............................. | B60K 6/28 363/17 |
| 7,518,886 B1 * | 4/2009 | Lai | ............................ | H02P 8/12 363/17 |
| 7,596,007 B2 * | 9/2009 | Phadke | ................. | H02M 3/285 363/71 |
| 7,830,686 B2 * | 11/2010 | Zeng | ..................... | H02M 3/285 363/69 |
| 8,295,066 B2 * | 10/2012 | Lin | ....................... | H02M 3/285 363/65 |
| 8,792,253 B2 * | 7/2014 | Wang | ................ | H02M 3/33507 323/272 |
| 9,214,825 B2 * | 12/2015 | Sun | ................... | H02M 3/33592 |
| 2003/0021132 A1 * | 1/2003 | Frus | ................. | H02M 3/33507 363/65 |
| 2006/0083037 A1 * | 4/2006 | Leung | ............... | H02M 3/33576 363/98 |
| 2007/0133239 A1 * | 6/2007 | Tanaka | .................. | H02M 3/337 363/65 |
| 2008/0129259 A1 * | 6/2008 | Endo | ................... | H02M 3/1584 323/271 |
| 2009/0168461 A1 * | 7/2009 | Nakahori | .......... | H02M 3/33561 363/17 |

(Continued)

FOREIGN PATENT DOCUMENTS

JP 07-264776 A 10/1995
JP 10-243554 A 9/1998
JP 2011-193713 A 9/2011

*Primary Examiner* — Timothy J Dole
*Assistant Examiner* — Yusef Ahmed
(74) *Attorney, Agent, or Firm* — Dinsmore & Shohl LLP

(57) ABSTRACT

A power conversion apparatus includes a plurality of power supply circuits each including a primary side circuit, and a secondary side circuit that is magnetically coupled to the primary side circuit via a transformer. Electrical power that changes according to a phase difference between switching of the primary side circuit and switching of the secondary side circuit is input and output to and from the power supply circuit. The power conversion apparatus includes a first power supply circuit, a second power supply circuit that uses, as an input side thereof, an output side of the first power supply circuit, and a control unit that adjusts residual power obtained by subtracting input power of the second power supply circuit from output power of the first power supply circuit, by controlling a phase difference of the first power supply circuit and a phase difference of the second power supply circuit.

9 Claims, 4 Drawing Sheets

(56) References Cited

U.S. PATENT DOCUMENTS

| | | | | |
|---|---|---|---|---|
| 2011/0198933 A1* | 8/2011 | Ishigaki | B60R 25/00 | 307/66 |
| 2013/0264984 A1* | 10/2013 | Tamura | H02M 7/48 | 318/400.27 |
| 2014/0132066 A1* | 5/2014 | Hirano | H02M 3/33584 | 307/17 |
| 2014/0133187 A1* | 5/2014 | Hirano | H02M 3/33592 | 363/17 |
| 2014/0233265 A1* | 8/2014 | Hirano | H02M 3/33576 | 363/17 |
| 2014/0237280 A1* | 8/2014 | Muto | G06F 1/3293 | 713/323 |
| 2014/0347889 A1* | 11/2014 | Muto | H02M 3/33584 | 363/17 |
| 2014/0347890 A1* | 11/2014 | Hirano | H02M 3/33561 | 363/17 |
| 2014/0347892 A1* | 11/2014 | Muto | H02M 3/33561 | 363/17 |
| 2015/0333634 A1* | 11/2015 | Yoshida | H02M 3/33576 | 363/21.03 |

* cited by examiner

POWER CONVERSION APPARATUS AND POWER CONVERSION METHOD

INCORPORATION BY REFERENCE

The disclosure of Japanese Patent Application No. 2013-107423 filed on May 21, 2013 including the specification, drawings and abstract is incorporated herein by reference in its entirety.

BACKGROUND OF THE INVENTION

1. Field of the Invention

This invention relates to a power conversion apparatus provided with a power supply circuit including a primary side circuit, and a secondary side circuit that is magnetically coupled to the primary side circuit via a transformer, and a power conversion method for converting the electrical power that is input to the power supply circuit.

2. Description of Related Art

A conventional power conversion apparatus can adjust an amount of power transmitted between a primary side circuit and a secondary side circuit by changing a phase difference between switching of the primary side circuit and switching of the secondary side circuit (see Japanese Patent Application Publication No. 2011-193713 (JP 2011-193713 A), for example).

SUMMARY OF THE INVENTION

Nevertheless, when an absolute value of the phase difference between the switching of the primary side circuit and the switching of the secondary side circuit decreases, the power conversion efficiency, which is a ratio of the electrical power that is input to one circuit of the primary side circuit and the secondary side circuit and the electrical power that is output from the other circuit, will deteriorate. Thus, an object of this invention is to provide a power conversion apparatus and a power conversion method capable of inhibiting the deterioration in the power conversion efficiency between the primary side circuit and the secondary side circuit.

A first aspect of this invention is a power conversion apparatus including: a first power supply circuit and a second power supply circuit that respectively include a primary side circuit, and a secondary side circuit that is magnetically coupled to the primary side circuit via a transformer, wherein electrical power that changes according to a phase difference between switching of the primary side circuit and switching of the secondary side circuit is input and output to and from the first power supply circuit and the second power supply circuit, respectively, and wherein an output side of the first power supply circuit is an input side of the second power supply circuit; and a control unit that adjusts residual power obtained by subtracting input power of the second power supply circuit from output power of the first power supply circuit, by controlling a phase difference of the first power supply circuit and a phase difference of the second power supply circuit.

Moreover, a second aspect of this invention is a power conversion method for converting electrical power that is input and output to and from a first power supply circuit and a second power supply circuit, respectively, wherein each of the first power supply circuit and the second power supply circuit includes a primary side circuit, and a secondary side circuit that is magnetically coupled to the primary side circuit via a transformer, wherein electrical power changes according to a phase difference between switching of the primary side circuit and switching of the secondary side circuit. The power conversion method includes adjusting residual power obtained by subtracting input power of the second power supply circuit from output power of the first power supply circuit, by controlling a phase difference of the first power supply circuit and a phase difference of the second power supply circuit that uses, as an input side thereof, an output side of the first power supply circuit.

It is thereby possible to inhibit the deterioration in the power conversion efficiency between the primary side circuit and the secondary side circuit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
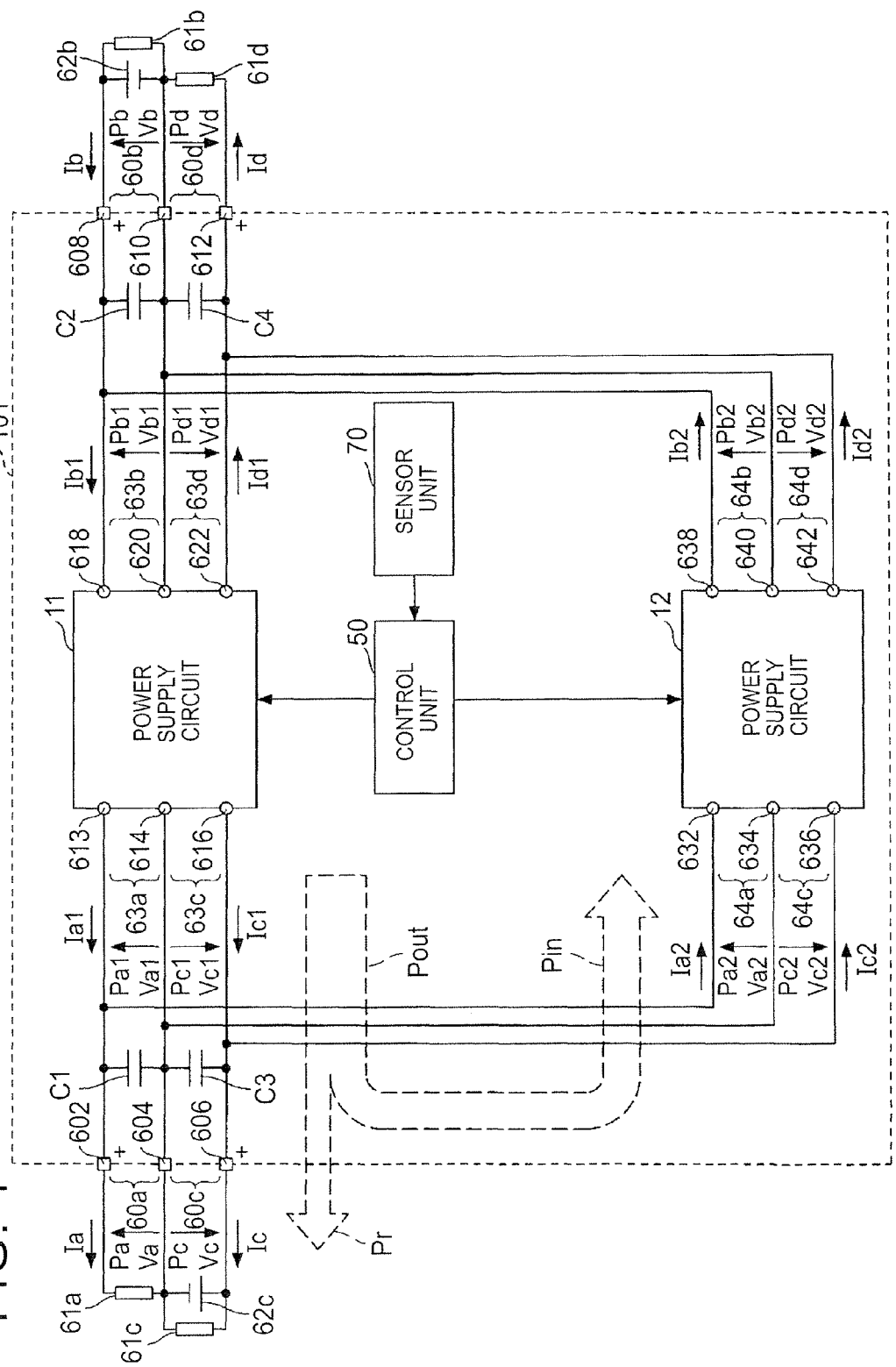
FIG. 1 is a block diagram showing an example of a configuration of a power supply apparatus serving as an embodiment of a power conversion apparatus according to the invention.

FIG. 1 is a block diagram showing an example of a configuration of a power supply apparatus 101 serving as an embodiment of a power conversion apparatus. The power supply apparatus 101 is a power supply system including, for example, a first power supply circuit 11, a second power supply circuit 12, a control unit 50, and a sensor unit 70. The power supply apparatus 101 is a system, for example, that is installed in a vehicle such as an automobile, and supplies electric power to the respective on-vehicle loads.

For example, the power supply apparatus 101 includes, as primary side ports, a first input/output port 60a to which a primary side high voltage system load 61a is connected and a second input/output port 60c to which a primary side low voltage system load 61c and a primary side low voltage system power supply 62c are connected. The primary side low voltage system power supply 62c supplies power to the primary side low voltage system load 61c, which is operated by an identical voltage system (a 12 V system, for example) to the primary side low voltage system power supply 62c. Further, the primary side low voltage system power supply 62c supplies power stepped up by a primary side conversion circuit 20 (described later) provided in the power supply circuits 11, 12 to the primary side high voltage system load 61a, which is operated by a different voltage system (a higher 48 V system than the 12 V system, for example) to the primary side low voltage system power supply 62c. A secondary battery such as a lead battery may be cited as a specific example of the primary side low voltage system power supply 62c.

For example, the power supply apparatus 101 includes, as secondary side ports, a third input/output port 60b to which a secondary side high voltage system load 61b and a secondary side high voltage system power supply 62b are connected and a fourth input/output port 60d to which a secondary side low voltage system load 61d is connected. The secondary side high voltage system power supply 62b supplies power to the secondary side high voltage system load 61b, which is operated by an identical voltage system (a higher 288 V system than the 12 V system and the 48 V system, for example) to the secondary side high voltage system power supply 62b. Further, the secondary side high voltage system power supply 62b supplies power stepped down by a secondary side conversion circuit 30 (described later) provided in the power supply circuits 11, 12 to the secondary side low voltage system load 61d, which is operated by a different voltage system (a lower 72 V system than the 288 V system, for example) to the secondary side high voltage system power supply 62b. A secondary battery such as a lithium ion battery may be cited as a specific example of the secondary side high voltage system power supply 62b.

The power supply apparatus 101 is a power conversion apparatus that includes the four input/output ports described above and has functions for selecting two desired input/output ports from the four input/output ports and performing power conversion between the two selected input/output ports. The first input/output port 60a is an input/output node that is common to the power supply circuits 11, 12 connected in parallel to the first input/output port 60a, and can be used for both input/output. The same applies to the other three input/output ports described above.

The power supply apparatus 101 is a direct current-direct current (DC-DC) converter including two power supply circuits 11, 12 that are connected to each other in parallel between the first and second input/output ports 60a, 60c and the third and fourth input/output ports 60b, 60d. As a result of redundantly including a plurality of power supply circuits as described above, it is possible to increase the output power that can be supplied to the respective loads 61a, 61b, 61c, 61d, and improve the fail-safe performance when there is a failure in some of the power supply circuits among the plurality of power supply circuits.

Port powers Pa, Pc, Pb, Pd are input/output powers (input powers or output powers) of the first input/output port 60a, the second input/output port 60c, the third input/output port 60b, and the fourth input/output port 60d, respectively. The port power Pa1, Pc1, Pb1, Pd1 that is input or output in the power supply circuit 11 is each electrical power in the first input/output port 63a connected to the first input/output port 60a, the second input/output port 63c connected to the second input/output port 60c, the third input/output port 63b connected to the third input/output port 60b, and the fourth input/output port 63d connected to the fourth input/output port 60d. The port power Pa2, Pc2, Pb2, Pd2 that is input or output in the power supply circuit 12 is each electrical power in the first input/output port 64a connected to the first input/output port 60a, the second input/output port 64c connected to the second input/output port 60c, the third input/output port 64b connected to the third input/output port 60b, and the fourth input/output port 64d connected to the fourth input/output port 60d.

The port voltages Va, Vc, Vb, Vd are each an input/output voltage (input voltage or output voltage) in the first input/output port 60a, the second input/output port 60c, the third input/output port 60b, and the fourth input/output port 60d. The port voltages Va1, Vc1, Vb1, Vd1 that are input or output in the power supply circuit 11 are each a voltage in the first input/output port 63a, the second input/output port 63c, the third input/output port 63b, and the fourth input/output port 63d. The port voltage Va2, Vc2, Vb2, Vd2 that are input or output in the power supply circuit 12 are each a voltage in the first input/output port 64a, the second input/output port 64c, the third input/output port 64b, and the fourth input/output port 64d.

The port currents Ia, Ic, Ib, Id are each an input/output current (input current or output current) in the first input/output port 60a, the second input/output port 60c, the third input/output port 60b, and the fourth input/output port 60d. The port currents Ia1, Ic1, Ib1, Id1 that are input or output in the power supply circuit 11 are each a current in the first input/output port 63a, the second input/output port 63c, the third input/output port 63b, and the fourth input/output port 63d. The port currents Ia2, Ic2, Ib2, Id2 that are input or output in the power supply circuit 12 are each a current in the first input/output port 64a, the second input/output port 64c, the third input/output port 64b, and the fourth input/output port 64d.

The power supply apparatus 101 includes a capacitor C1 provided in the first input/output port 60a, a capacitor C3 provided in the second input/output port 60c, a capacitor C2 provided in the third input/output port 60b, and a capacitor C4 provided in the fourth input/output port 60d. Film capacitors, aluminum electrolytic capacitors, ceramic capacitors, polymer electrolytic capacitors, and so on may be cited as specific examples of the capacitors C1, C2, C3, C4.

The capacitor C1 is inserted between a high potential side terminal 602 of the first input/output port 60a and a low potential side terminal 604 of the first input/output port 60a and the second input/output port 60c. The capacitor C3 is inserted between a high potential side terminal 606 of the second input/output port 60c and the low potential side terminal 604 of the first input/output port 60a and the second input/output port 60c. The capacitor C2 is inserted between a high potential side terminal 608 of the third input/output port 60b and a low potential side terminal 610 of the third input/output port 60b and the fourth input/output port 60d. The capacitor C4 is inserted between a high potential side terminal 612 of the fourth input/output port 60d and the low potential side terminal 610 of the third input/output port 60b and the fourth input/output port 60d.

The capacitors C1, C2, C3, C4 may be provided either inside or outside the power supply apparatus 101.

Figure 2:
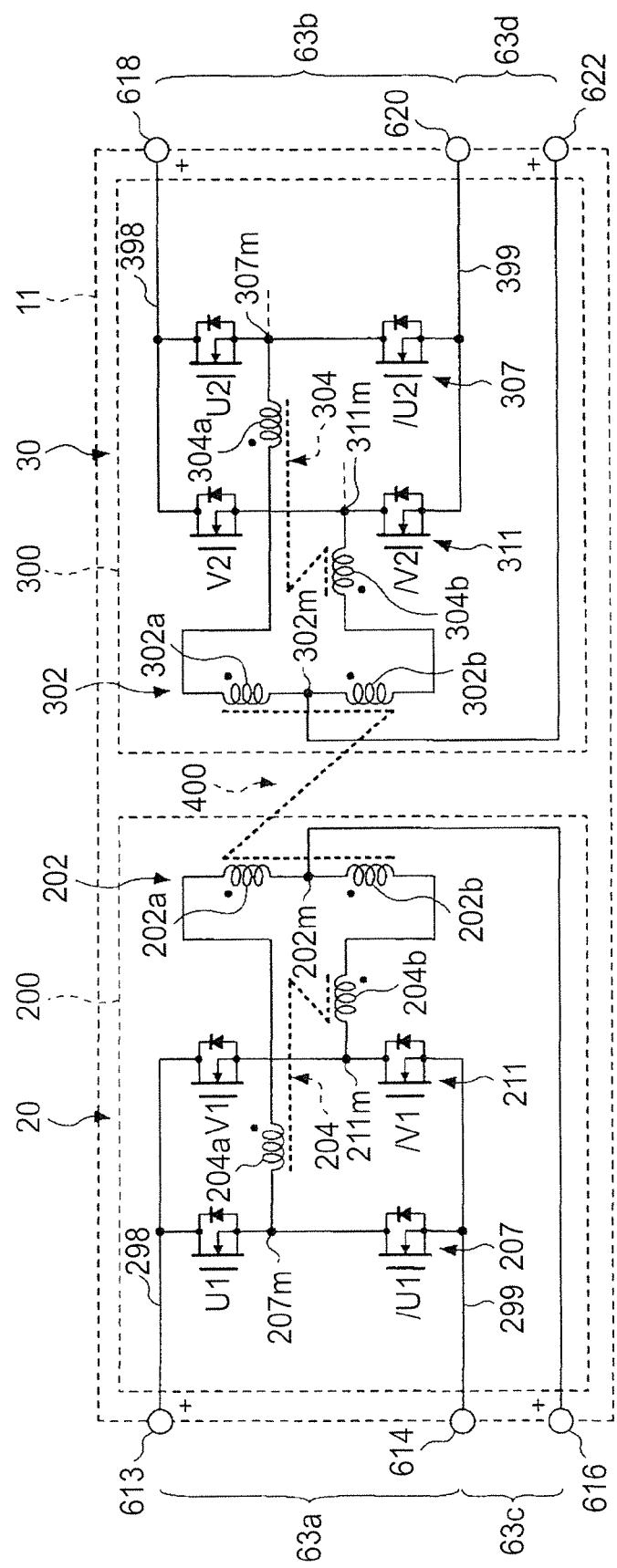
FIG. 2 is a circuit diagram showing an example of a configuration of a power supply circuit according to this embodiment.

FIG. 2 is a circuit diagram showing an example of a configuration of a power supply circuit 11. Next, the configuration of the power supply circuit 11 will be described also with reference to FIG. 1. Description of the configuration of the power supply circuit 12, which is the same as that of the power supply circuit 11, will be omitted.

The power supply circuit 11 is a power conversion circuit configured to include the primary side conversion circuit 20 and the secondary side conversion circuit 30. Note that the primary side conversion circuit 20 and the secondary side conversion circuit 30 are connected via a primary side magnetic coupling reactor 204 and a secondary side magnetic coupling reactor 304, and magnetically coupled by a transformer 400 (a center tapped transformer).

The primary side conversion circuit 20 is a primary side circuit configured to include a primary side full bridge circuit 200, the first input/output port 63a, and the second input/output port 63c. The primary side full bridge circuit 200 is a primary side power conversion unit configured to include a primary side coil 202 of the transformer 400, the primary side magnetic coupling reactor 204, a primary side first upper arm U1, a primary side first lower arm/U1, a primary side second upper arm V1, and a primary side second lower arm/V1. Here, the primary side first upper arm U1, the primary side first lower arm/U1, the primary side second upper arm V1, and the primary side second lower arm/V1 are constituted by switching elements respectively configured to include, for example, an N channel type metal oxide semiconductor field effect transistor (MOSFET) and a body diode serving as a parasitic element of the MOSFET. Additional diodes may be connected to the MOSFET in parallel.

The primary side full bridge circuit 200 includes a primary side positive electrode bus line 298 connected to the high potential side terminals 602, 613 of the first input/output ports 60a, 63a, and a primary side negative electrode bus line 299 connected to the low potential side terminals 604, 614 of the first input/output ports 60a, 63a and the second input/output ports 60c, 63c.

A primary side first arm circuit 207 connecting the primary side first upper arm U1 and the primary side first lower arm/U1 in series is attached between the primary side positive electrode bus line 298 and the primary side negative electrode bus line 299. The primary side first arm circuit 207 is a primary side first power conversion circuit unit (a primary side U phase power conversion circuit unit) capable of performing a power conversion operation by switching the primary side first upper arm U1 and the primary side first lower arm/U1 ON and OFF. Further, a primary side second arm circuit 211 connecting the primary side second upper arm V1 and the primary side second lower arm/V1 in series is attached between the primary side positive electrode bus line 298 and the primary side negative electrode bus line 299 in parallel with the primary side first arm circuit 207. The primary side second arm circuit 211 is a primary side second power conversion circuit unit (a primary side V phase power conversion circuit unit) capable of performing a power conversion operation by switching the primary side second upper arm V1 and the primary side second lower arm/V1 ON and OFF.

The primary side coil 202 and the primary side magnetic coupling reactor 204 are provided in a bridge part connecting a midpoint 207m of the primary side first arm circuit 207 to a midpoint 211m of the primary side second arm circuit 211. To describe connection relationships to the bridge part in more detail, one end of a primary side first reactor 204a of the primary side magnetic coupling reactor 204 is connected to the midpoint 207m of the primary side first arm circuit 207, and one end of the primary side coil 202 is connected to another end of the primary side first reactor 204a. Further, one end of a primary side second reactor 204b of the primary side magnetic coupling reactor 204 is connected to another end of the primary side coil 202, and another end of the primary side second reactor 204b is connected to the midpoint 211m of the primary side second arm circuit 211. Note that the primary side magnetic coupling reactor 204 is configured to include the primary side first reactor 204a and the primary side second reactor 204b, which is magnetically coupled to the primary side first reactor 204a by a coupling coefficient $k_1$.

The midpoint 207m is a primary side first intermediate node between the primary side first upper arm U1 and the primary side first lower arm/U1, and the midpoint 211m is a primary side second intermediate node between the primary side second upper arm V1 and the primary side second lower arm/V1.

The first input/output ports 60a, 63a are ports provided between the primary side positive electrode bus line 298 and the primary side negative electrode bus line 299. The first input/output port 60a (63a) is configured to include the terminal 602 and the terminal 604 (the terminal 613 and the terminal 614). The second input/output ports 60c, 63c are ports provided between the primary side negative electrode bus line 299 and a center tap 202m of the primary side coil 202. The second input/output port 60c (63c) is configured to include the terminal 604 and the terminal 606 (the terminal 614 and the terminal 616).

The center tap 202m is connected to the high potential side terminals 606, 616 of the second input/output ports 60c, 63c. The center tap 202m is an intermediate connection point between a primary side first winding 202a and a primary side second winding 202b constituting the primary side coil 202.

The secondary side conversion circuit 30 is a secondary side circuit configured to include a secondary side full bridge circuit 300, the third input/output port 63b, and the fourth input/output port 63d. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm/U2, a secondary side second upper arm V2, and a secondary side second lower arm/V2. Here, the secondary side first upper arm U2, the secondary side first lower arm/U2, the secondary side second upper arm V2, and the secondary side second lower arm/V2 are constituted by switching elements respectively configured to include, for example, an N channel type MOSFET and a body diode serving as a parasitic element of the MOSFET. Additional diodes may be connected to the MOSFET in parallel.

The secondary side full bridge circuit 300 includes a secondary side positive electrode bus line 398 connected to the high potential side terminals 608, 618 of the third input/output ports 60b, 63b, and a secondary side negative electrode bus line 399 connected to the low potential side terminals 610, 620 of the third input/output ports 60b, 63b and the fourth input/output ports 60d, 63d.

A secondary side first arm circuit 307 connecting the secondary side first upper arm U2 and the secondary side first lower arm/U2 in series is attached between the secondary side positive electrode bus line 398 and the secondary side negative electrode bus line 399. The secondary side first arm circuit 307 is a secondary side first power conversion circuit unit (a secondary side U phase power conversion circuit unit) capable of performing a power conversion operation by switching the secondary side first upper arm U2 and the secondary side first lower arm/U2 ON and OFF. Further, a secondary side second arm circuit 311 connecting the secondary side second upper arm V2 and the secondary side second lower arm/V2 in series is attached between the secondary side positive electrode bus line 398 and the secondary side negative electrode bus line 399 in parallel with the secondary side first arm circuit 307. The secondary side second arm circuit 311 is a secondary side second power conversion circuit unit (a secondary side V phase power conversion circuit unit) capable of performing a power conversion operation by switching the secondary side second upper arm V2 and the secondary side second lower arm/V2 ON and OFF.

The secondary side coil 302 and the secondary side magnetic coupling reactor 304 are provided in a bridge part connecting a midpoint 307m of the secondary side first arm circuit 307 to a midpoint 311m of the secondary side second arm circuit 311. To describe connection relationships to the bridge part in more detail, one end of a secondary side first reactor 304a of the secondary side magnetic coupling reactor 304 is connected to the midpoint 307m of the secondary side first arm circuit 307, and one end of the secondary side coil 302 is connected to another end of the secondary side first reactor 304a. Further, one end of a secondary side second reactor 304b of the secondary side magnetic coupling reactor 304 is connected to another end of the secondary side coil 302, and another end of the secondary side second reactor 304b is connected to the midpoint 311m of the secondary side second arm circuit 311. Note that the secondary side magnetic coupling reactor 304 is configured to include the secondary side first reactor 304a and the secondary side second reactor 304b, which is magnetically coupled to the secondary side first reactor 304a by a coupling coefficient $k_2$.

The midpoint 307m is a secondary side first intermediate node between the secondary side first upper arm U2 and the secondary side first lower arm/U2, and the midpoint 311m is a secondary side second intermediate node between the secondary side second upper arm V2 and the secondary side second lower arm/V2.

The third input/output ports 60b, 63b are ports provided between the secondary side positive electrode bus line 398 and the secondary side negative electrode bus line 399. The third input/output port 60b (63b) is configured to include the terminal 608 and the terminal 610 (the terminal 618 and the terminal 620). The fourth input/output ports 60d, 63d are ports provided between the secondary side negative electrode bus line 399 and a center tap 302m of the secondary side coil 302. The fourth input/output port 60d (63d) is configured to include the terminal 610 and the terminal 612 (the terminal 620 and the terminal 622).

The center tap 302m is connected to the high potential side terminals 612, 622 of the fourth input/output ports 60d, 63d. The center tap 302m is an intermediate connection point between a secondary side first winding 302a and a secondary side second winding 302b constituting the secondary side coil 302.

In FIG. 1, the power supply apparatus 101 includes the sensor unit 70. The sensor unit 70 serves as detecting means that detects an input/output value Y of at least one of the first to fourth input/output ports 60a, 60c, 60b, 60d at predetermined detection period intervals and outputs a detection value Yd corresponding to the detected input/output value Y to the control unit 50. The detection value Yd may be a detected voltage obtained by detecting the input/output voltage, a detected current obtained by detecting the input/output current, or a detected power obtained by detecting the input/output power. The sensor unit 70 may be provided either inside or outside the power supply circuits 11, 12.

The sensor unit 70 includes, for example, a voltage detection unit that detects the input/output voltage generated in at least one of the first to fourth input/output ports 60a, 60c, 60b, 60d. For example, the sensor unit 70 includes a primary side voltage detection unit that outputs at least one detected voltage from among an input/output voltage Va and an input/output voltage Vc as a primary side voltage detection value, and a secondary side voltage detection unit that outputs at least one detected voltage from among an input/output voltage Vb and an input/output voltage Vd as a secondary side voltage detection value.

The voltage detection unit of the sensor unit 70 includes, for example, a voltage sensor that monitors an input/output voltage value of at least one port, and a voltage detection circuit that outputs a detected voltage corresponding to the input/output voltage value monitored by the voltage sensor to the control unit 50.

The sensor unit 70 includes, for example, a current detection unit that detects the input/output current flowing through at least one of the first to fourth input/output ports 60a, 60c, 60b, 60d. For example, the sensor unit 70 includes a primary side current detection unit that outputs at least one detected current from among an input/output current Ia and an input/output current Ic as a primary side current detection value, and a secondary side current detection unit that outputs at least one detected current from among an input/output current Ib and an input/output current Id as a secondary side current detection value.

The current detection unit of the sensor unit 70 includes, for example, a current sensor that monitors an input/output current value of at least one port, and a current detection circuit that outputs a detected current corresponding to the input/output current value monitored by the current sensor to the control unit 50.

The power supply apparatus 101 includes the control unit 50. For example, the control unit 50 is an electronic circuit that includes a microcomputer having an inbuilt central processing unit (CPU). The control unit 50 may be provided either inside or outside the power supply circuits 11, 12.

The control unit 50 feedback-controls a power conversion operation performed by the power supply circuits 11, 12 such that the detected value Yd of the input/output value Y of at least one of the first to fourth input/output ports 60a, 60c, 60b, 60d converges to a target value Yo set in the port. For example, the target value Yo is a command value set by the control unit 50 or a predetermined apparatus other than the control unit 50 on the basis of driving conditions defined in relation to the respective loads (the primary side low voltage system load 61c and so on, for example) connected to the input/output ports. The target value Yo functions as an output target value when power is output from the port and an input target value when power is input into the port, and may be a target voltage value Yvo, a target current value Yio, or a target power value Ypo.

The control unit 50 controls the input/output power in the input/output ports 63a to 63d, 64a to 64d of the respective power supply circuits 11, 12 so that, for example, the deviation between the target value Yo and the detection value Yd of the I/O value Y becomes zero.

Further, the control unit 50 feedback-controls the power conversion operation performed by the power supply circuits 11, 12 such that a transmitted power Q transmitted between the primary side conversion circuit 20 and the secondary side conversion circuit 30 via the transformer 400 converges to a set target transmitted power Qo. The transmitted power will also be referred to as a power transmission amount. For example, the target transmitted power Qo is a command value set by the control unit 50 or a predetermined apparatus other than the control unit 50 on the basis of a deviation between the detected value Yd and the target value Yo in one of the ports.

The control unit 50 performs feedback-control to the power conversion operation that is performed in the respective power supply circuits 11, 12 by changing the value of the predetermined control parameter X, and can thereby adjust the input/output power in the input/output ports 63a to 63d, 64a to 64d of the respective power supply circuits 11, 12. It is thereby possible to adjust the I/O value Y in each of the first to fourth input/output ports 60a, 60c, 60b, 60d of the power supply apparatus 101. As the main control parameter X, considered may be the two types of control variables of phase difference φ and duty ratio D (ON time δ).

The phase difference φ is a deviation (a time lag) between switching timings of identical-phase power conversion circuit units of the primary side full bridge circuit 200 and the secondary side full bridge circuit 300. The duty ratio D (the ON time δ) is a duty ratio (an ON time) between switching waveforms of the respective power conversion circuit units constituting the primary side full bridge circuit 200 and the secondary side full bridge circuit 300.

These two control parameters X may be mutually controlled independently. The control unit 50 changes the input/ output power in the input/output ports 63a to 63d, 64a to 64d of the respective power supply circuits 11, 12 on the basis of the duty ratio control and/or the phase control of the primary side full bridge circuit 200 and the secondary side full bridge circuit 300 by using the phase difference φ and the duty ratio D (ON time δ). The I/O value Y in the respective input/output ports 60a to 60d of the power supply apparatus 101 is thereby changed.

Figure 3:
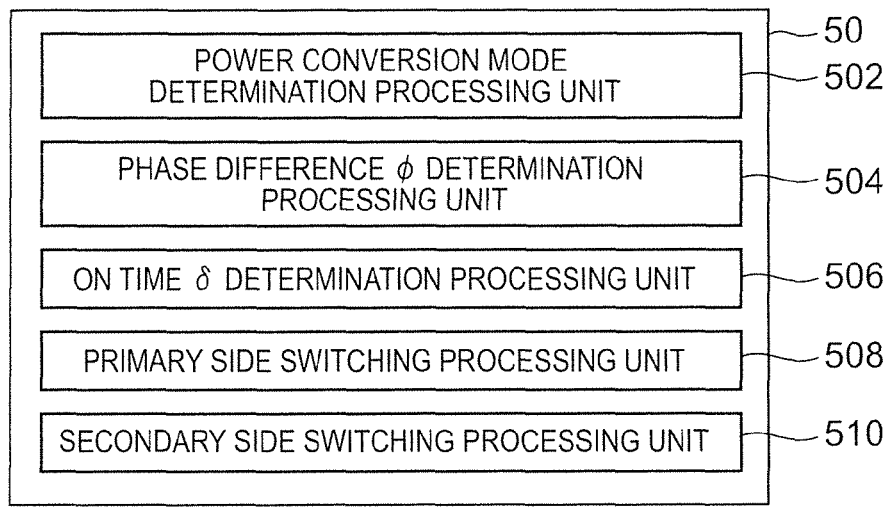
FIG. 3 is a block diagram showing an example of a configuration of a control unit according to this embodiment.

FIG. 3 is a block diagram of the control unit 50. The control unit 50 is a control unit having a function for performing switching control on the respective switching elements of the primary side conversion circuit 20, such as the primary side first upper arm U1, and the respective switching elements of the secondary side conversion circuit 30, such as the secondary side first upper arm U2. The control unit 50 is configured to include a power conversion mode determination processing unit 502, a phase difference φ determination processing unit 504, an ON time δ determination processing unit 506, a primary side switching processing unit 508, and a secondary side switching processing unit 510. For example, the control unit 50 is an electronic circuit that includes a microcomputer having an inbuilt CPU.

For example, the power conversion mode determination processing unit 502 selects and sets an operating mode from among power conversion modes A to L of the power supply apparatus 101, to be described below, on the basis of a predetermined external signal (for example, a signal indicating the deviation between the detected value Yd and the target value Yo in one of the ports). As regards the power conversion modes, in mode A, power input from the first input/output port 60a is converted and output to the second input/output port 60c. In mode B, power input from the first input/output port 60a is converted and output to the third input/output port 60b. In mode C, power input from the first input/output port 60a is converted and output to the fourth input/output port 60d.

In mode D, power input from the second input/output port 60c is converted and output to the first input/output port 60a. In mode E, power input from the second input/output port 60c is converted and output to the third input/output port 60b. In mode F, power input from the second input/output port 60c is converted and output to the fourth input/output port 60d.

In mode G, power input from the third input/output port 60b is converted and output to the first input/output port 60a. In mode H, power input from the third input/output port 60b is converted and output to the second input/output port 60c. In mode I, power input from the third input/output port 60b is converted and output to the fourth input/output port 60d.

In mode J, power input from the fourth input/output port 60d is converted and output to the first input/output port 60a. In mode K, power input from the fourth input/output port 60d is converted and output to the second input/output port 60c. In mode L, power input from the fourth input/output port 60d is converted and output to the third input/output port 60b.

The phase difference φ determination processing unit 504 has a function for setting a phase difference φ between switching period motions of the switching elements between the primary side conversion circuit 20 and the secondary side conversion circuit 30 in order to cause the power supply apparatus 101 to function as a DC-DC converter circuit.

The ON time δ determination processing unit 506 has a function for setting an ON time δ of the switching elements of the primary side conversion circuit 20 and the secondary side conversion circuit 30 in order to cause the primary side conversion circuit 20 and the secondary side conversion circuit 30 to function respectively as step-up/step-down circuits.

The primary side switching processing unit 508 has a function for performing switching control on the respective switching elements constituted by the primary side first upper arm U1, the primary side first lower arm/U1, the primary side second upper arm V1, and the primary side second lower arm/V1, on the basis of outputs of the power conversion mode determination processing unit 502, the phase difference φ determination processing unit 504, and the ON time δ determination processing unit 506.

The secondary side switching processing unit 510 has a function for performing switching control on the respective switching elements constituted by the secondary side first upper arm U2, the secondary side first lower arm/U2, the secondary side second upper arm V2, and the secondary side second lower arm/V2, on the basis of the outputs of the power conversion mode determination processing unit 502, the phase difference φ determination processing unit 504, and the ON time δ determination processing unit 506.

An operation of the power supply apparatus 101 having the above configuration will now be described using FIGS. 1 to 3. When, for example, an external signal requesting an operation in which the power conversion mode of the power supply circuit 11 is set at mode F is input, the power conversion mode determination processing unit 502 of the control unit 50 sets the power conversion mode of the power supply circuit 11 to mode F. At this time, a voltage input into the second input/output port 63c is stepped up by a step-up function of the primary side conversion circuit 20, whereupon power having the stepped-up voltage is transmitted to the third input/output port 63b side by a DC-DC converter circuit function of the power supply circuit 11, stepped down by a step-down function of the secondary side conversion circuit 30, and then output from the fourth input/output port 63d.

Here, a step-up/step-down function of the primary side conversion circuit 20 will be described in detail. Focusing on the second input/output port 63c and the first input/output port 63a, the terminal 616 of the second input/output port 63c is connected to the midpoint 207m of the primary side first arm circuit 207 via the primary side first winding 202a and the primary side first reactor 204a connected in series to the primary side first winding 202a. Respective ends of the primary side first arm circuit 207 are connected to the first input/output port 63a, and as a result, a step-up/step-down circuit is attached between the terminal 616 of the second input/output port 63c and the first input/output port 63a.

The terminal 616 of the second input/output port 63c is also connected to the midpoint 211m of the primary side second arm circuit 211 via the primary side second winding 202b and the primary side second reactor 204b connected in series to the primary side second winding 202b. Respective ends of the primary side second arm circuit 211 are connected to the first input/output port 63a, and as a result, a step-up/step-down circuit is attached in parallel between the terminal 616 of the second input/output port 63c and the first input/output port 63a. Note that since the secondary side conversion circuit 30 is a circuit having a substantially identical configuration to the primary side conversion circuit 20, two step-up/step-down circuits are likewise connected in parallel between the terminal 622 of the fourth input/output port 63d and the third input/output port 63b. Hence, the secondary side conversion circuit 30 has an identical step-up/step-down function to the primary side conversion circuit 20.

Next, the function of the power supply circuit 11 as a DC-DC converter circuit will be described in detail. Focusing on the first input/output port 63a and the third input/output port 63b, the primary side full bridge circuit 200 is connected to the first input/output port 63a, and the secondary side full bridge circuit 300 is connected to the third input/output port 63b. When the primary side coil 202 provided in the bridge part of the primary side full bridge circuit 200 and the secondary side coil 302 provided in the bridge part of the secondary side full bridge circuit 300 are magnetically coupled by a coupling coefficient $k_T$, the transformer 400 functions as a center tapped transformer having a number of windings 1:N. Hence, by adjusting the phase difference φ between the switching period motions of the switching elements in the primary side full bridge circuit 200 and the secondary side full bridge circuit 300, power input into the first input/output port 63a can be converted and transmitted to the third input/output port 63b or power input into the third input/output port 63b can be converted and transmitted to the first input/output port 63a.

Figure 4:
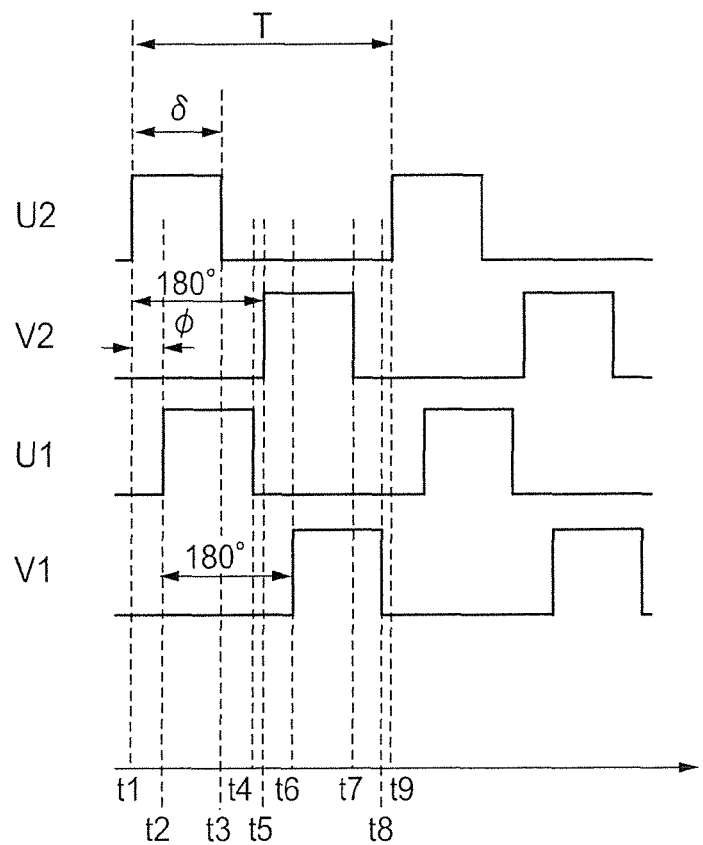
FIG. 4 is a timing chart showing an example of switching operations of a primary side circuit and a secondary side circuit according to this embodiment.

FIG. 4 is a view showing a timing chart of ON/OFF switching waveforms of the respective arms provided in the power supply circuit 11 resulting from control executed by the control unit 50. In FIG. 4, U1 is an ON/OFF waveform of the primary side first upper arm U1, V1 is an ON/OFF waveform of the primary side second upper arm V1, U2 is an ON/OFF waveform of the secondary side first upper arm U2, and V2 is an ON/OFF waveform of the secondary side second upper arm V2. ON/OFF waveforms of the primary side first lower arm/U1, the primary side second lower arm/V1, the secondary side first lower arm/U2, and the secondary side second lower arm/V2 are inverted waveforms (not shown) obtained by respectively inverting the ON/OFF waveforms of the primary side first upper arm U1, the primary side second upper arm V1, the secondary side first upper arm U2, and the secondary side second upper arm V2. Note that dead time is preferably provided between the respective ON/OFF waveforms of the upper and lower arms to prevent a through current from flowing when both the upper and lower arms are switched ON. Further, in FIG. 4, a high level indicates an ON condition and a low level indicates an OFF condition.

Here, by modifying the respective ON times δ of U1, V1, U2, and V2, step-up/step-down ratios of the primary side conversion circuit 20 and the secondary side conversion circuit 30 can be modified. For example, by making the respective ON times δ of U1, V1, U2, and V2 equal to each other, the step-up/step-down ratio of the primary side conversion circuit 20 can be made equal to the step-up/step-down ratio of the secondary side conversion circuit 30.

The ON time δ determination processing unit 506 make the respective ON times δ of U1, V1, U2, and V2 equal to each other (respective ON times δ=primary side ON time δ11=secondary side ON time δ12=time value α) so that the respective step-up/step-down ratios of the primary side conversion circuit 20 and the secondary side conversion circuit 30 are equal to each other.

The step-up/step-down ratio of the primary side conversion circuit 20 is determined by the duty ratio D, which is a proportion of a switching period T of the switching elements (arms) constituting the primary side full bridge circuit 200 occupied by the ON time δ. Similarly, the step-up/step-down ratio of the secondary side conversion circuit 30 is determined by the duty ratio D, which is a proportion of the switching period T of the switching elements (arms) constituting the secondary side full bridge circuit 300 occupied by the ON time δ. The step-up/step-down ratio of the primary side conversion circuit 20 is a transformation ratio between the first input/output port 63a and the second input/output port 63c, while the step-up/step-down ratio of the secondary side conversion circuit 30 is a transformation ratio between the third input/output port 63b and the fourth input/output port 63d.

Therefore, for example, the step-up/step-down ratio of the primary side conversion circuit 20
=the voltage of the second input/output port 63c/the voltage of the first input/output port 63a
=$δ11/T=α/T$, and the step-up/step-down ratio of the secondary side conversion circuit 30
=the voltage of the fourth input/output port 63d/the voltage of the third input/output port 63b
=$δ12/T=α/T$.

In other words, the respective step-up/step-down ratios of the primary side conversion circuit 20 and the secondary side conversion circuit 30 take identical values (=α/T).

Note that the ON time δ in FIG. 4 represents both the ON time δ11 of the primary side first upper arm U11 and the primary side second upper arm V1 and the ON time δ12 of the secondary side first upper arm U2 and the secondary side second upper arm V2. Further, the switching period T of the arms constituting the primary side full bridge circuit 200 and the switching period T of the arms constituting the secondary side full bridge circuit 300 are equal times.

Furthermore, a phase difference between U1 and V1 is activated at 180 degrees (π), and a phase difference between U2 and V2 is likewise activated at 180 degrees (π). Moreover, by changing the phase difference φ between U1 and U2, the power transmission amount Q between the primary side conversion circuit 20 and the secondary side conversion circuit 30 can be adjusted such that when the phase difference φ>0, power can be transmitted from the primary side conversion circuit 20 to the secondary side conversion circuit 30, and when the phase difference φ<0, power can be transmitted from the secondary side conversion circuit 30 to the primary side conversion circuit 20.

The phase difference φ is a deviation (a time lag) between the switching timings of identical-phase power conversion circuit units of the primary side full bridge circuit 200 and the secondary side full bridge circuit 300. For example, the phase difference φ is a deviation between the switching timings of the primary side first arm circuit 207 and the secondary side first arm circuit 307, and a deviation between the switching timings of the primary side second arm circuit 211 and the secondary side second arm circuit 311. These deviations are controlled to be equal to each other. In other words, the phase difference φ between U1 and U2 and the phase difference φ between V1 and V2 are controlled to identical values.

Hence, when, for example, an external signal requesting an operation in which the power conversion mode of the power supply circuit 11 is set at mode F is input, the power conversion mode determination processing unit 502 selects and sets mode F. The ON time δ determination processing unit 506 then sets the ON time δ to define a step-up ratio required when the primary side conversion circuit 20 is caused to function as a step-up circuit that steps up the voltage input into the second input/output port 63c and outputs the stepped-up voltage to the first input/output port 63a. Note that the secondary side conversion circuit 30 functions as a step-down circuit that steps down the voltage input into the third input/output port 63b at a step-down ratio defined in accordance with the ON time δ set by the ON time δ determination processing unit 506, and outputs the stepped-down voltage to the fourth input/output port 63d. Further, the phase difference φ determination processing unit 504 sets the phase difference φ such that the power input into the first input/output port 63a is transmitted to the third input/output port 63b in the desired power transmission amount Q.

The primary side switching processing unit 508 performs switching control on the respective switching elements constituted by the primary side first upper arm U1, the primary side first lower arm/U1, the primary side second upper arm V1, and the primary side second lower arm/V1 to cause the primary side conversion circuit 20 to function as a step-up circuit and to cause the primary side conversion circuit 20 to function as a part of a DC-DC converter circuit.

The secondary side switching processing unit 510 performs switching control on the respective switching elements constituted by the secondary side first upper arm U2, the secondary side first lower arm/U2, the secondary side second upper arm V2, and the secondary side second lower arm/V2 to cause the secondary side conversion circuit 30 to function as a step-down circuit and to cause the secondary side conversion circuit 30 to function as a part of a DC-DC converter circuit.

As described above, the primary side conversion circuit 20 and the secondary side conversion circuit 30 can be caused to function as a step-up circuit or a step-down circuit, and the power supply circuit 11 can be caused to function as a bidirectional DC-DC converter circuit. Therefore, power conversion can be performed in all of the power conversion modes A to L, or in other words, power conversion can be performed between two input/output ports selected from the four input/output ports.

This kind of control is executed to both the power supply circuit 11 and the power supply circuit 12. The control unit 50 changes the duty ratio D and the phase difference φ of at least one power supply circuit of the power supply circuits 11, 12 so that the detection value Yd of the I/O value Y follows the target value Yo.

The transmitted power Q (also referred to as the power transmission amount Q) adjusted by the control unit 50 in accordance with the phase difference φ is power transmitted from one of the primary side conversion circuit 20 and the secondary side conversion circuit 30 to the other via the transformer 400, and is expressed as:

$$Q = (N \times Va \times Vb)/(\pi \times \omega \times L) \times F(D, \phi) \quad \text{Equation 1.}$$

Note that N is a winding ratio of the transformer 400, Va is the input/output voltage of the first input/output port 60a, Vb is the input/output voltage of the third input/output port 60b, π is pi, ω (=2πf=2π/T) is an angular frequency of the switching operations of the primary side conversion circuit 20 and the secondary side conversion circuit 30, f is a switching frequency of the primary side conversion circuit 20 and the secondary side conversion circuit 30, T is the switching period of the primary side conversion circuit 20 and the secondary side conversion circuit 30, L is an equivalent inductance of the magnetic coupling reactors 204, 304 and the transformer 400 relating to power transmission, and F (D, φ) is a function having the duty ratio D and the phase difference φ as variables and a variable that increases monotonically as the phase difference φ increases, independently of the duty ratio D. The duty ratio D and the phase difference φ are control parameters designed to vary within a range sandwiched between predetermined upper and lower limit values.

The control unit 50 adjusts the transmitted power Q by changing the phase difference φ such that a port voltage Vp of at least one predetermined port from among the primary side ports and the secondary side ports converges to the target voltage Vo. Therefore, even when a current consumption of the load connected to the predetermined port increases, the control unit 50 can prevent the port voltage Vp from dropping relative to the target voltage Vo by varying the phase difference φ in order to adjust the transmitted power Q.

For example, the control unit 50 adjusts the transmitted power Q by changing the phase difference φ such that the port voltage Vp in one port serving as a transmission destination of the transmitted power Q, from among the primary side ports and the secondary side ports, converges to the target voltage Vo. Therefore, even when the current consumption of the load connected to the port serving as the transmission destination of the transmitted power Q increases, the control unit 50 can prevent the port voltage Vp from dropping relative to the target voltage Vo by increasing the phase difference φ in order to adjust the transmitted power Q in an increasing direction.

Meanwhile, according to Equation 1, the transmitted power Q that is input/output via the transformer 400 between the primary side conversion circuit 20 and the secondary side conversion circuit 30 in the power supply circuit 11 increases monotonically as the phase difference φ of the power supply circuit 11 increases. Hence, the port power Pa1, Pc1, Pb1, Pd1 that is input or output to or from the input/output ports 63a to 63d configured in the primary side conversion circuit 20 and the secondary side conversion circuit 30 in the power supply circuit 11 also increases monotonically as the transmitted power Q increases monotonically in the power supply circuit 11. Similarly, when the phase difference φ of the power supply circuit 12 increases, the port power Pa2, Pc2, Pb2, Pd2 that is input or output to or from the input/output ports 64a to 64d configured in the primary side conversion circuit 20 and the secondary side conversion circuit 30 in the power supply circuit 12 also increases monotonically as the transmitted power Q increases monotonically in the power supply circuit 12.

Figure 5:
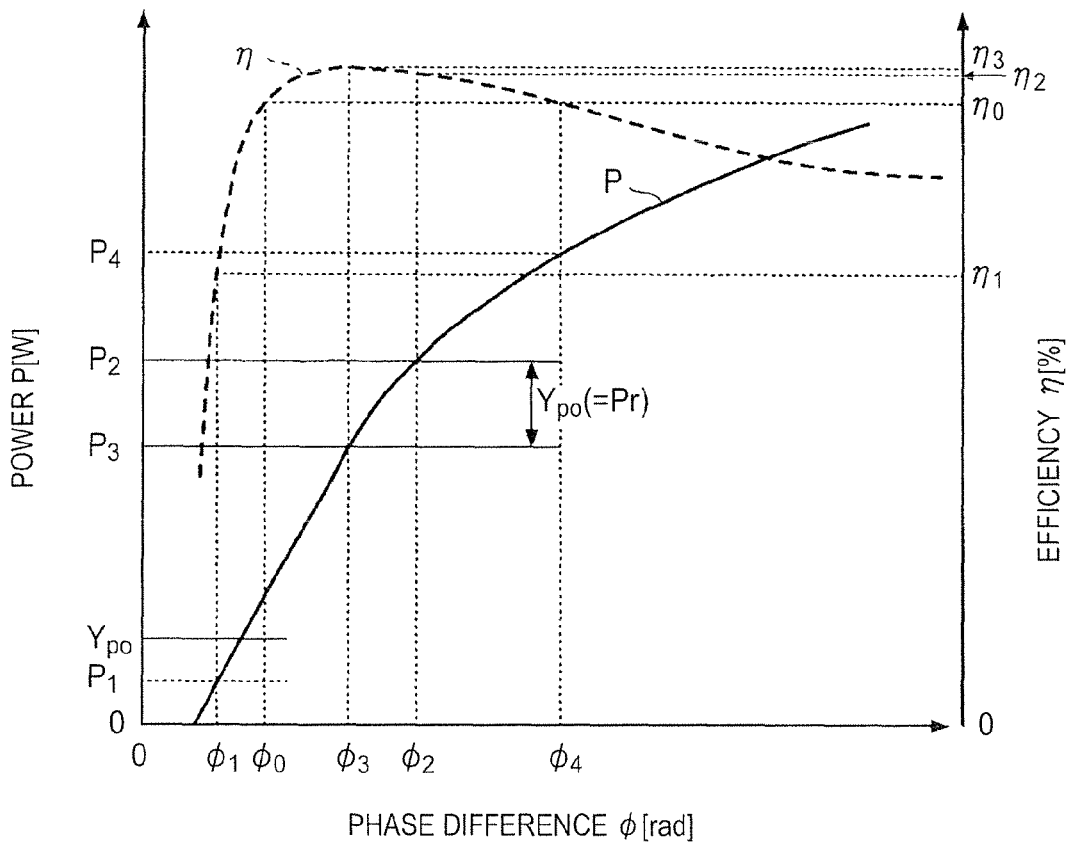
FIG. 5 is a graph showing the relation of a phase difference, a port power and a power conversion efficiency according to this embodiment.

FIG. 5 is a graph showing the relation of the phase difference φ, the port power P and the efficiency η. The port power P represents the electrical power that is input or output to or from the primary side port of the primary side conversion circuit 20, or the electrical power that is input or output to or from the secondary side port of the secondary side conversion circuit 30. The primary side ports of the primary side conversion circuit 20 are the first input/output port 63a and the second input/output port 63c in the case of the power supply circuit 11, and are the first input/output port 64a and the second input/output port 64c in the case of the power supply circuit 12. The secondary side ports of the secondary side conversion circuit 30 are the third input/output port 63b and the fourth input/output port 63d in the case of the power supply circuit 11, and are the third input/output port 64b and the fourth input/output port 64d in the case of the power supply circuit 12.

The efficiency η is the power conversion efficiency between the primary side port of the primary side conversion circuit 20 and the secondary side port of the secondary side conversion circuit 30, and is represented with the ratio of the output power relative to the input power. Of the primary side port and the secondary side port, when the input power input to one port is defined as Pin, the output power output from the other port is defined as Pout, the input voltage input to one port is defined as Vin, the output voltage output from the other port is defined as Vout, the input current input to one port is defined as Iin, and the output current output from the other port is defined as Iout, the efficiency η can be represented as follows:

$$\eta = Pout/Pin \quad \text{Equation 2}$$
$$= (Vout \times Iout)/(Vin \times Iin).$$

For example, in FIGS. 1 and 2, when the port power Pb1 input to the third input/output port 63b is converted and the converted port power Pa1 is output to the first input/output port 63a, and the electrical power Pa1 of the first input/output port 63a is converted and the converted electrical power Pc1 is output to the second input/output port 63c, the efficiency η of the power supply circuit 11 can be represented as follows according to Equation 2:

$$\eta = (Va1 \times Ia1 + Vc1 \times Ic1)/(Vb1 \times Ib1) \qquad \text{Equation 3.}$$

Note that Equation 3 is an equation in a case of not using the fourth input/output ports 60d, 63d, 64d, and the electrical power that is input or output in the fourth input/output ports 60d, 63d, 64d is zero (for example, no configuration of the secondary side low voltage system load 61d and the capacitor C4).

Nevertheless, with the power supply circuits 11, 12, as shown in FIG. 5, there are cases where the efficiency η will deteriorate as the absolute value of the phase difference φ is smaller (to put it differently, as the port power P that changes according to the phase difference φ is smaller).

Thus, the control unit 50 adjusts the residual power Pr (=Pout−Pin), which is obtained by subtracting the input power Pin of the power supply circuit 12 that uses the output side of the power supply circuit 11 as the input side from the output power Pout of the power supply circuit 11, by controlling the phase difference φ of the respective power supply circuits 11, 12 (refer to FIG. 1). The power supply circuit 12 sets a part of the output power Pout of the conversion circuit of the output side as the input power Pin of the primary side conversion circuit 20 and the secondary side conversion circuit 30 in the power supply circuit 11. The input power Pin is smaller than the output power Pout.

Accordingly, the control unit 50 can reduce the residual power Pr that is output from the power supply apparatus 101 even upon increasing the phase difference φ of the power supply circuit 11 and increasing the output power Pout of the power supply circuit 11, and increasing the phase difference φ of the power supply circuit 12 and increasing the input power Pin of the power supply circuit 12. As described above, even when the residual power Pr that is output from an input/output port that is common to the power supply circuit 11 and the power supply circuit 12 is relatively small, the phase difference φ of the respective power supply circuits 11, 12 can be increased and, therefore, it is possible to inhibit the efficiency η of the respective power supply circuits 11, 12 from deteriorating due to the reduction in the phase difference φ.

FIG. 1 illustrates a case when the output power Pout of the power supply circuit 11 is a total power as a sum of the port power Pa1 output from the first input/output port 63a and the port power Pc1 output from the second input/output port 63c. Moreover, FIG. 1 illustrates a case when the input power Pin of the power supply circuit 12 is a total power as a sum of the port power Pa2 input to the first input/output port 64a and the port power Pc2 input to the second input/output port 64c.

Considered is a case where the primary side port of both the power supply circuits 11, 12 is set as an output port. In the foregoing case, the total power Ps as a sum of the output power Pout1 from the primary side ports 63a, 63c of the power supply circuit 11 and the output power Pout2 from the primary side ports 64a, 64c of the power supply circuit 12 is output from the primary side ports 60a, 60c of the power supply apparatus 101. The control unit 50 controls the phase difference φ to be smaller as the target power value Ypo as the target value of the total power Ps decreases. As shown in FIG. 5, the control unit 50 can set both the output power Pout1, Pout2 to $P_1$ by controlling the phase difference φ of both power supply circuits 11, 12 to $\phi_1$. It is thereby possible to cause the total power Ps (=Pout1+Pout2=$P_1$+$P_1$) to converge to the decreased target power value Ypo. Nevertheless, when the phase difference φ is decreased to $\phi_1$, the efficiency η of the power supply circuits 11, 12 will deteriorate to $\eta_1$.

Meanwhile, when the control unit 50 is to output the residual power Pr from the primary side ports 60a, 60c of the power supply apparatus 101, the control unit 50 controls the phase difference φ of the power supply circuit 11 to $\phi_2$ and controls the phase difference φ of the power supply circuit 12 to $\phi_3$ (<$\phi_2$) upon limiting the range of changing the phase difference φ of the power supply circuits 11, 12 to be a lower limit $\phi_0$ or more and an upper limit $\phi_4$ or less.

Consequently, the output power Pout of the power supply circuit 11 becomes $P_2$, and the input power Pin of the power supply circuit 12 becomes $P_3$ (<$P_2$). As a result, similar to the case of converging of the total power Ps, it is possible to cause the residual power Pr (=$P_2$−$P_3$) to converge to the decreased target power value Ypo. In addition, by controlling the phase difference φ in the power supply circuit 11 to $\phi_2$, the efficiency η of the power supply circuit 11 can be increased to $\eta_2$ that is not less than the predetermined reference value $\eta_0$, and, by controlling the phase difference φ in the power supply circuit 12 to $\phi_3$, the efficiency η of the power supply circuit 12 can be increased to $\eta_3$ that is not less than the reference value $\eta_0$. That is, the deterioration of the efficiency η caused by the phase difference φ decreasing to a level that is less than the lower limit $\phi_0$ can be prevented, and the deterioration of the efficiency η caused by the phase difference φ increasing to a level that is greater than the upper limit $\phi_4$ can be prevented.

Moreover, by adjusting the residual power Pr, it is possible to prevent the phase difference φ of the power supply circuits 11, 12 from changing in a range where the efficiency η or the operational stability is relatively low even when the demanded target power value Ypo is relatively small. In addition, even when the phase difference φ of the power supply circuits 11, 12 increases, the relatively small residual power Pr can be stably adjusted to the target power value Ypo in a range where the efficiency η of the power supply circuits 11, 12 is relatively high. In addition, since the efficiency η of the power supply circuits 11, 12 can be increased, it is possible to minimize the loss caused by the power supply circuit 12 extracting the output power Pout of the power supply circuit 11.

The control unit 50 adjusts the phase difference φ of the power supply circuit 12 such that the residual power Pr converges to the target power value Ypo, for example, by limiting the range of changing the phase difference φ of the power supply circuit 11 to a lower limit $\phi_0$ or more and an upper limit $\phi_4$ or less. Preferably, the control unit 50 adjusts the phase difference φ of the power supply circuit 12 such that the residual power Pr converges to the target power value Ypo by fixing the phase difference φ of the power supply circuit 11 to a constant value that is a lower limit $\phi_0$ or more and an upper limit $\phi_4$ or less (for example, a value in which the efficiency η of the power supply circuit 11 will take on a maximum value). Since the value of the phase difference φ of the power supply circuit 11 is thereby limited, it is possible to cause the residual power Pr to promptly converge to the target power value Ypo while inhibiting the fluctuation in the residual power Pr.

In the case of FIG. 1, the power supply circuit 12 uses the input side of the power supply circuit 11 as the output side. Consequently, since a part or the whole of the electrical power output from the input/output ports 64b, 64d of the power supply circuit 12 can be returned and input to the input/output ports 63b, 63d of the power supply circuit 11, the power conversion efficiency of the overall power supply apparatus 101 can be improved.

Figure 6:
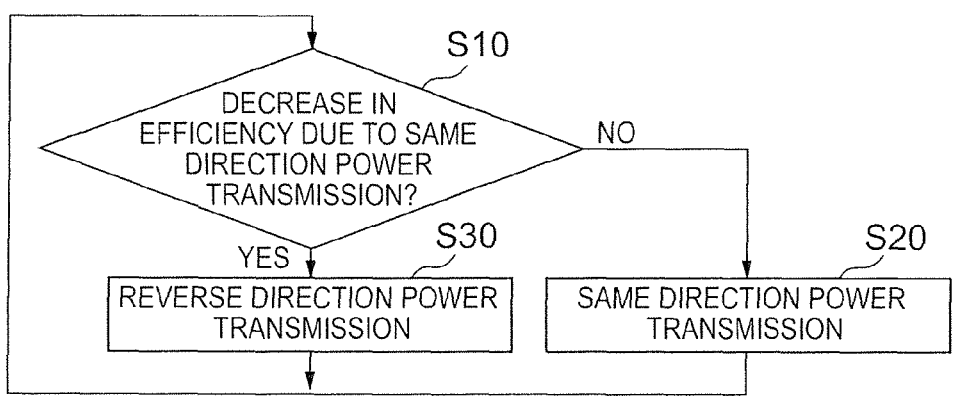
FIG. 6 is a flowchart showing an example of a power conversion method according to the invention.

FIG. 6 is a flowchart showing an example of the power conversion method of converting the electrical power input to the secondary side port of the power supply circuit 11. The control unit 50 determines whether a predetermined condition of the efficiency η of one of the power supply circuits 11, 12 will fall below the predetermined reference value $η_0$ is satisfied in a state where both power supply circuits 11, 12 transmit electrical power in the same direction from the secondary side to the primary side (step S10).

When the control unit 50 determines that this predetermined condition is not satisfied, the control unit 50 continues the state of fixing the power transmission direction of the power supply circuits 11, 12 to the same direction from the secondary side to the primary side (step S20). Consequently, the total power Ps as a sum of the output power Pout1 of the power supply circuit 11 and the output power Pout2 of the power supply circuit 12 can be output from the primary side port of the power supply apparatus 101 that is functioning as an output port that is common to the power supply circuits 11, 12.

Meanwhile, when the control unit 50 determines that the predetermined condition is satisfied, the control unit 50 changes the power transmission direction of the power supply circuit 12 from the same direction as the power transmission direction of the power supply circuit 11 (direction from the secondary side to the primary side) to a direction that is opposite to the power transmission direction of the power supply circuit 11 (direction from the primary side to the secondary side) (step S30). Consequently, the residual power Pr can be output from the primary side port of the power supply apparatus 101 that is functioning as an output port that is common to the power supply circuits 11, 12.

For example, in step S30, the control unit 50 adjusts the phase difference φ of the respective power supply circuits 11, 12 so that the residual power Pr coincides with the target power value Ypo. For example, the control unit 50 adjusts the phase difference φ of the power supply circuit 12 to a predetermined constant value $φ_3$ in a manner of gradually causing the phase difference φ of the power supply circuit 11 to approach a predetermined constant value $φ_2$, and converting the electrical power input to the primary side port of the power supply circuit 12 so that it is returned to the secondary side port of the power supply circuit 11.

Moreover, for example, in step S10, the control unit 50 changes the input side of the power supply circuit 12 from the input side to the output side of the power supply circuit 11 on the basis of the level of the efficiency η of one of the power supply circuits 11, 12. Deterioration of the efficiency η can be inhibited on the basis of the foregoing control. When the control unit 50 detects, for example, that the efficiency η decreases relative to the reference value $η_0$ ("detect" may include the meaning of "estimate"), the control unit 50 changes the input side of the power supply circuit 12 to the output side of the power supply circuit 11 so as to increase the efficiency η to be greater than the reference value $η_0$.

The efficiency η is derived, for example, according to Equation 2 (particularly Equation 3) on the basis of the detection value Yd output from the sensor unit 70 (specifically, the detection values output from the primary side voltage detection unit, the primary side current detection unit, the secondary side voltage detection unit and the secondary side current detection unit). For example, the control unit 50 calculates the efficiency η by substituting the detection value Yd in Equation 2 or Equation 3. The control unit 50 performs control of changing the input side of the power supply circuit 12 to the output side of the power supply circuit 11 according to the calculated efficiency η.

Otherwise, the efficiency η may also be derived, for example, on the basis of the correlation of the phase difference φ and the efficiency η. For example, the correlation of the phase difference φ and the efficiency η is measured in advance upon the manufacture of the power supply apparatus 101 (or the power supply circuits 11, 12), and the map or program constant that prescribes the measured correlation is stored in advance in a storage device that is configured in the control unit 50. The control unit 50 is thereby able to derive the efficiency η corresponding to the phase difference φ according to the map stored in the storage device. Moreover, as a result of the efficiency η being derived from the correlation of the phase difference φ and the efficiency η, the efficiency η can be estimated on the basis of the phase difference φ even without the current detection unit that is configured in the sensor unit 70. Hence, for example, it is possible to reduce the operational load of the control unit 50, improve the responsiveness of the control unit 50, and attain the cost reduction of the power supply apparatus 101.

Moreover, for example, in step S10, the control unit 50 changes the input side of the power supply circuit 12 from the input side to the output side of the power supply circuit 11 on the basis of the level of the phase difference φ of one of the power supply circuits 11, 12. Deterioration of the efficiency η can be inhibited on the basis of the foregoing control. Since there is correlation between the phase difference φ and the efficiency η, the control unit 50 may change the input side of the power supply circuit 12 to the output side of the power supply circuit 11 so as to increase the efficiency η to be greater than the reference value $η_0$ when it is detected that the phase difference φ is less than the lower limit $φ_0$ or exceeds the upper limit $φ_4$.

Moreover, for example, in step S10, the control unit 50 changes the input side of the power supply circuit 12 from the input side to the output side of the power supply circuit 11 on the basis of the level of the target power value Ypo of the total power Ps as the sum of the output power Pout 1 of the power supply circuit 11 and the output power Pout2 of the power supply circuit 12. On the basis of this control, for example, by changing the input side of the power supply circuit 12 from the input side to the output side of the power supply circuit 11 when a target power value Ypo that is less than a predetermined threshold is commanded, the phase difference φ is controlled to be small according to the command, and deterioration in the efficiency η can thereby be prevented.

An embodiment of the power conversion apparatus and power conversion method was described above, but the invention is not limited to the above embodiment, and various amendments and improvements, such as combining or replacing the above embodiment either partially or wholly with another embodiment, may be implemented within the scope of the invention.

For example, in the above embodiment, a MOSFET, which is a semiconductor element subjected to an ON/OFF operation, was cited as an example of the switching element. However, the switching element may be a voltage control type power element using an insulating gate such as an insulated gate bipolar transistor (IGBT) or a MOSFET, or a bipolar transistor, for example.

Further, a power supply may be connected to the first input/output port 60a, and a power supply may be connected to the fourth input/output port 60d. Furthermore, a power supply need not be connected to the second input/output port 60c, and a power supply need not be connected to the third input/output port 60b.

Moreover, in FIG. 1, the primary side low voltage system power supply 62c is connected to the second input/output port 60c, but a power supply need not be connected to either the first input/output port 60a or the second input/output port 60c.

Moreover, the control unit 50 may adjust the phase difference $\phi_4$ of the power supply circuit 11 such that the residual power Pr converges to the target power value Ypo by limiting the range of changing the phase difference $\phi$ of the power supply circuit 12 to be a lower limit $\phi_0$ or more and a upper limit $\phi_4$ or less. Preferably, the control unit 50 adjusts the phase difference $\phi$ of the power supply circuit 11 such that the residual power Pr converges to the target power value Ypo by fixing the phase difference $\phi$ of the power supply circuit 12 to a constant value that is a lower limit $\phi_0$ or more and a upper limit $\phi_4$ or less (for example, value in which the efficiency $\eta$ of the power supply circuit 12 takes on a maximum value). Since the value of the phase difference $\phi$ of the power supply circuit 12 is thereby limited, it is possible to cause the residual power Pr to promptly converge to the target power value Ypo while inhibiting the fluctuation in the residual power Pr.

Moreover, when the secondary side port of both power supply circuits 11, 12 is set to an output port, the control unit 50 may adjust the residual power Pr by changing the input side of the power supply circuit of one of the power supply circuits 11, 12 to an output side of the other power supply circuit.

Moreover, a plurality of first power supply circuits may be provided without limitation to a single first power supply circuit. Similarly, a plurality of second power supply circuits may be provided without limitation to a single second power supply circuit.

What is claimed is:

1. A power conversion apparatus comprising:
   a first power supply circuit and a second power supply circuit that respectively include a primary side circuit, and a secondary side circuit that is magnetically coupled to the primary side circuit via a transformer, wherein electrical power that changes according to a phase difference between switching of the primary side circuit and switching of the secondary side circuit is input and output to and from the first power supply circuit and the second power supply circuit, respectively, and wherein an output side of the first power supply circuit is an input side of the second power supply circuit; and
   a control unit configured to adjust residual power obtained by subtracting input power of the second power supply circuit from output power of the first power supply circuit, by controlling a phase difference of the first power supply circuit and a phase difference of the second power supply circuit.

2. The power conversion apparatus according to claim 1, wherein the second power supply circuit uses, as an output side thereof, an input side of the first power supply circuit.

3. The power conversion apparatus according to claim 1, wherein the control unit adjusts the phase difference of the second power supply circuit by limiting an extent to which the phase difference of the first power supply circuit is changed.

4. The power conversion apparatus according to claim 1, wherein the control unit adjusts the phase difference of the second power supply circuit by fixing the phase difference of the first power supply circuit to a constant value.

5. A power conversion method for converting electrical power that is input and output to and from a first power supply circuit and a second power supply circuit, respectively, wherein each of the first power supply circuit and the second power supply circuit includes a primary side circuit, and a secondary side circuit that is magnetically coupled to the primary side circuit via a transformer, and wherein the electrical power changes according to a phase difference between switching of the primary side circuit and switching of the secondary side circuit, the power conversion method comprising:
   adjusting residual power obtained by subtracting input power of the second power supply circuit from output power of the first power supply circuit by controlling a phase difference of the first power supply circuit and a phase difference of the second power supply circuit that uses, as an input side thereof, an output side of the first power supply circuit.

6. The power conversion method according to claim 5, wherein the input side of the second power supply circuit is changed to the output side of the first power supply circuit on the basis of a predetermined condition.

7. The power conversion method according to claim 6, wherein the input side of the second power supply circuit is changed to the output side of the first power supply circuit on the basis of a level of a power conversion efficiency between the primary side circuit and the secondary side circuit.

8. The power conversion method according to claim 6, wherein the input side of the second power supply circuit is changed to the output side of the first power supply circuit on the basis of a level of one of the phase difference of the first power supply circuit and the phase difference of the second power supply circuit.

9. The power conversion method according to claim 6, wherein the input side of the second power supply circuit is changed to the output side of the first power supply circuit on the basis of a size of a target value of a total power as a sum of output power of the first power supply circuit and output power of the second power supply circuit.

* * * * *